United States Patent
Tsumemitsu (10) Patent No.: US 11,789,599 B2
(45) Date of Patent: Oct. 17, 2023

(54) INFORMATION PROCESSING DEVICE AND NON-TRANSITORY COMPUTER READABLE MEDIUM

(71) Applicant: FUJIFILM BUSINESS INNOVATION CORP., Tokyo (JP)

(72) Inventor: Masaya Tsumemitsu, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 450 days.

(21) Appl. No.: 16/829,671

(22) Filed: Mar. 25, 2020

(65) Prior Publication Data

US 2021/0042024 A1    Feb. 11, 2021

(30) Foreign Application Priority Data

Aug. 8, 2019  (JP) ................................. 2019-146050

(51) Int. Cl.
  *G06F 3/048* (2013.01)
  *G06F 3/04847* (2022.01)
  *H04N 1/00* (2006.01)
  *G06F 3/0482* (2013.01)

(52) U.S. Cl.
  CPC ........ *G06F 3/04847* (2013.01); *G06F 3/0482* (2013.01); *H04N 1/00411* (2013.01)

(58) Field of Classification Search
  CPC ........................... G06F 3/0482; G06F 3/04847
  See application file for complete search history.

(56) References Cited

U.S. PATENT DOCUMENTS

| | | | |
|---|---|---|---|
| 7,069,580 B1* | 6/2006 | Deitz | G05B 19/0428 713/168 |
| 2010/0214571 A1* | 8/2010 | Luo | G06F 3/1204 715/769 |
| 2014/0029032 A1* | 1/2014 | Hilbert | H04N 1/00307 358/1.15 |
| 2014/0215410 A1* | 7/2014 | Fleizach | G06F 3/04883 715/863 |
| 2017/0085729 A1* | 3/2017 | Yoshida | H04N 1/00413 |
| 2020/0097162 A1* | 3/2020 | Hayashi | G06F 3/14 |

FOREIGN PATENT DOCUMENTS

| | | |
|---|---|---|
| JP | 2011-035742 A | 2/2011 |
| JP | 2012-88912 A | 5/2012 |
| JP | 2014-82775 A | 5/2014 |
| JP | 2017-72941 A | 4/2017 |
| JP | 2017-117195 A | 6/2017 |

OTHER PUBLICATIONS

Mar. 14, 2023 Office Action issued in Japanese Patent Application No. 2019-146050.

* cited by examiner

*Primary Examiner* — Claudia Dragoescu
(74) *Attorney, Agent, or Firm* — Oliff PLC (57) ABSTRACT

An information processing device includes a processor programmed to: receive an instruction from a user; and select, based on the received instruction, between: a first mode that receives a selection of a workflow to process target data before the target data is received; and a second mode that receives a selection of a workflow to process target data after the target data is received.

11 Claims, 7 Drawing Sheets

| WORKFLOW ID | WORKFLOW NAME | ATTRIBUTE | SET VALUE | HANDLING OF NON-MATCH | CONFIRM |
|---|---|---|---|---|---|
| WF0001 | WORKFLOW 1 | DOCUMENT TYPE | INVOICE | DENY | N |
| | | FILE FORMAT | XDW | IGNORE | Y |
| | | COLOR MODE | COLOR | IGNORE | Y |
| | | ... | ... | ... | ... |
| WF0002 | WORKFLOW 2 | DOCUMENT TYPE | COST ESTIMATE | DENY | N |
| | | FILE FORMAT | PDF | OVERWRITE | Y |
| | | COLOR MODE | COLOR | IGNORE | N |
| | | ... | ... | ... | ... |
| WF0003 | WORKFLOW 3 | DOCUMENT TYPE | COST ESTIMATE | DENY | N |
| | | FILE FORMAT | PDF | IGNORE | N |
| | | COLOR MODE | BLACK AND WHITE | IGNORE | Y |
| | | ... | ... | ... | ... |
| WF0004 | WORKFLOW 4 | DOCUMENT TYPE | INVOICE | DENY | N |
| | | FILE FORMAT | PDF | IGNORE | Y |
| | | COLOR MODE | BLACK AND WHITE | IGNORE | Y |
| | | ... | ... | ... | ... |

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-146050 filed Aug. 8, 2019.

BACKGROUND

(i) Technical Field

The present disclosure relates to an information processing device and a non-transitory computer readable medium.

(ii) Related Art

In the related art, an information processing device capable of processing target data according to predetermined processing content is known. The predetermined processing content is called a workflow.

Japanese Unexamined Patent Application Publication No. 2014-82775 discloses a document processing device that, when a workflow is selected by a user, acquires target data, namely an electronic document, through a scan process, and processes the electronic document according to the selected workflow. The document processing device notifies the user in the case where there is insufficient information about the electronic document for processing the electronic document according to the selected workflow.

Also, in the related art, an information processing device that classifies multiple pieces of target data on the basis of attribute information related to the target data is known.

For example, Japanese Unexamined Patent Application Publication No. 2012-88912 discloses a document management system that distributes and stores multiple electronic documents in multiple storage folders on the basis of information such as a fax number that indicates a transmission source or a transmission destination of the target data, that is, the electronic documents. Also, Japanese Unexamined Patent Application Publication No. 2017-072941 discloses a document distribution system that distributes and stores multiple electronic documents in multiple folders on the basis of character strings extracted from the electronic documents.

SUMMARY

In the case of wanting to process target data according to a workflow, it may be necessary for the user to select a workflow, but in information processing devices of the related art, the timing when a workflow is selectable is locked to a single timing. Specifically, the timing is locked to either before or after the information processing device receives the target data.

The timing of selecting a workflow may also be after the information processing device receives the target data. For example, in some cases, there are multiple workflows available, and the user is unsure of which workflow is suited to the target data the user wants to process. In such cases, it may be desirable for the information processing device to receive the target data and start processing the target data to a certain extent before the user selects a workflow. On the other hand, depending on the user, which workflow to use to process the target data may be clearly understood in advance, and the user may want to select the workflow before the information processing device receives the target data.

Aspects of non-limiting embodiments of the present disclosure relate to enabling a user to select a workflow to process target data either before or after the information processing device receives the target data.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing device including a processor programmed to: receive an instruction from a user; and select, based on the received instruction, between: a first mode that receives a selection of a workflow to process target data before the target data is received; and a second mode that receives a selection of a workflow to process target data after the target data is received.

BRIEF DESCRIPTION OF THE DRAWINGS

An exemplary embodiment of the present disclosure will be described in detail based on the following figures, wherein.

DETAILED DESCRIPTION

Figure 1:
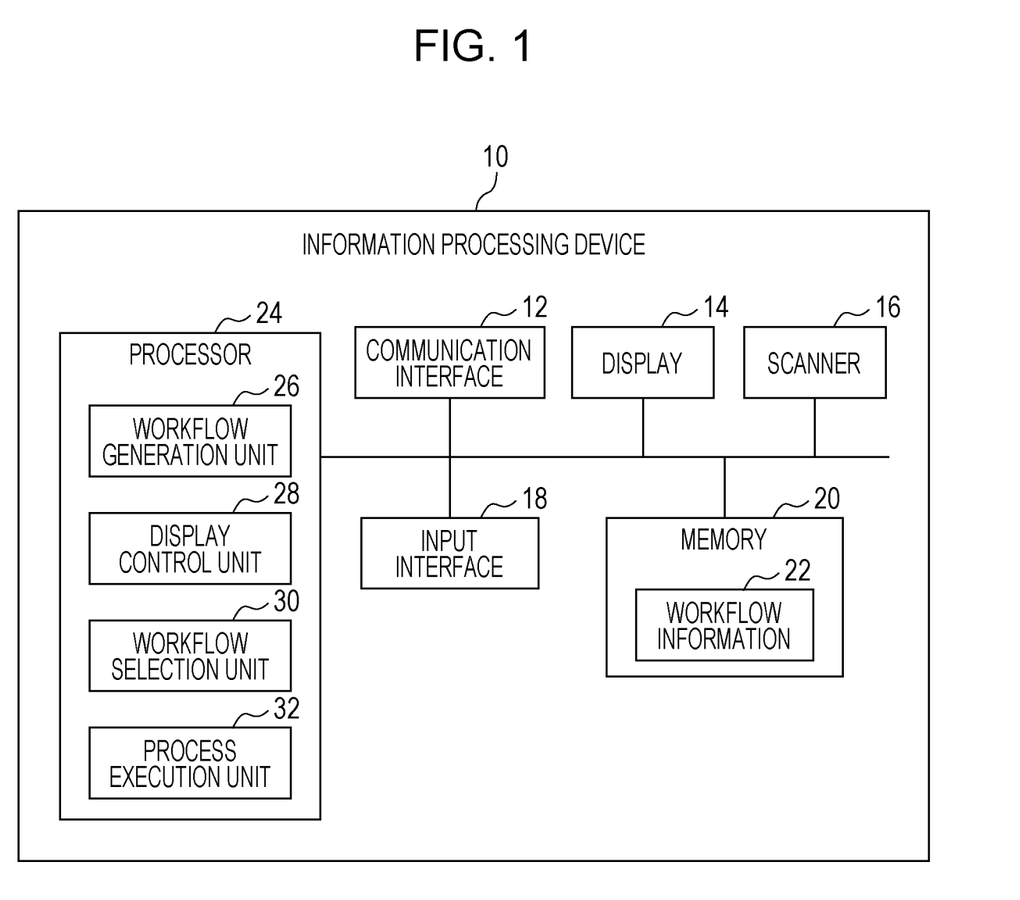
FIG. 1 is a schematic configuration diagram of an information processing device according to an exemplary embodiment.

FIG. 1 is a schematic configuration diagram of an information processing device 10 according to the exemplary embodiment. In the exemplary embodiment, the information processing device 10 is an image processing device provided with functions such as a scan function that optically reads a recording medium and generates image data, a copy function that prints scanned image data, a print function that prints image data designated by a user (in the following description, the term "user" means the end user of the information processing device 10) onto a recording medium, and a fax function that transmits image data designated by the user to a designated transmission destination. Additionally, the information processing device 10 may also be capable of executing a process of storing data designated by the user in a specific folder internal or external to the information processing device 10. The information processing device 10 is not limited to an image processing device, and may be any device capable of executing a process according to a workflow with respect to target data as described below.

In this specification, the term "workflow" means predetermined processing content. The workflow may include multiple processes, such as performing a specific procedure (such as conversion or treatment) on the target data, storing the target data in a specific folder, and transmitting the target data to a specific transmission destination, for example. In this case, in the workflow, the series of processes may be executed sequentially, or at least some of the multiple processes may be executed in parallel (contemporaneously). Also, the workflow may include a single process, such as storing the target data in a specific folder, for example.

In the exemplary embodiment, the data to be subjected to processing according to the workflow, or in other words the target data, is an electronic document containing one or multiple pieces of image data generated by optically reading a paper document, but the target data is not limited thereto. For example, the target data may also be an electronic document prepared in advance by the user. In addition, instead of an electronic document, the target data may also be image data expressing a photograph or drawing, source code of a program, or an executable file (EXE file) of a program. Note that in this specification, causing target data to be processed according to a workflow is also referred to as inputting the target data into the workflow.

A communication interface 12 includes a device such as a wired or wireless LAN adapter for example. The communication interface 12 exhibits a function of communicating with other devices through a communication channel such as a LAN or the Internet. Through the communication interface 12, it is possible to receive an electronic document as target data and transmit an electronic document to another device.

A display 14 includes a device such as a liquid crystal display, for example. On the display 14, various information is displayed and presented to the user of the information processing device 10.

A scanner 16 includes components such as a transparent platen, a light source, and an image sensor, for example. The scanner 16 optically reads a paper document set on the platen by the user, and generates an electronic document as target data corresponding to the paper document. Note that the information processing device 10 may also include a printer for printing image data onto a recording medium.

An input interface 18 includes components such as a touch panel and various buttons, for example. The input interface 18 is used to input user instructions into the information processing device 10.

Memory 20 includes devices such as a hard disk, a solid-state drive (SSD), ROM, or RAM, for example. The memory 20 may be provided separately from a processor 24 described later, or at least a part of the memory 20 may be provided internally to the processor 24. The memory 20 stores an information processing program for causing each unit of the information processing device 10 to operate. Also, as illustrated in FIG. 1, the memory 20 stores workflow information 22. The workflow information 22 is information related to available workflows in the information processing device 10. Details about the workflow information 22 will be described together with the process by a workflow generation unit 26 described later.

The processor 24 refers to a processing device in a broad sense, and includes at least one of general processors (such as a central processing unit (CPU), for example) and dedicated processors (such as a graphics processing unit (GPU), an application-specific integrated circuit (ASIC), a field-programmable gate array (FPGA), or a programmable logic device, for example). The processor 24 may be realized by a single processing device or by the cooperation of multiple processing devices located at physically distant positions. As illustrated in FIG. 1, by cooperating with the information processing program stored in the memory 20, the processor 24 exhibits the functions of the workflow generation unit 26, a display control unit 28, a workflow selection unit 30, and a process execution unit 32.

The workflow generation unit 26 generates a workflow according to an instruction from someone such as a user or an administrator of the information processing device 10. In the following description, the user or administrator generates a workflow using the information processing device 10, but the user or administrator may also generate a workflow using another terminal (for example, a personal computer) other than the information processing device 10. In this case, the functions corresponding to the workflow generation unit 26 are exhibited by the other terminal. By transmitting information related to the workflow generated by the other terminal to the information processing device 10, it becomes possible to use the workflow in the information processing device 10.

First, the user or administrator inputs relevant information using the input interface 18 to thereby set the name of the workflow to newly generate, as well as the types and order of processes to be executed in the workflow. The types of processes include processes such as storing the target data, or in other words an electronic document, in a specific folder, transmitting the electronic document to a specific transmission destination, printing the electronic document, or performing a specific procedure (such as changing the file format or changing the resolution) on the electronic document, for example, but the types of processes obviously are not limited to the above.

Figure 2:
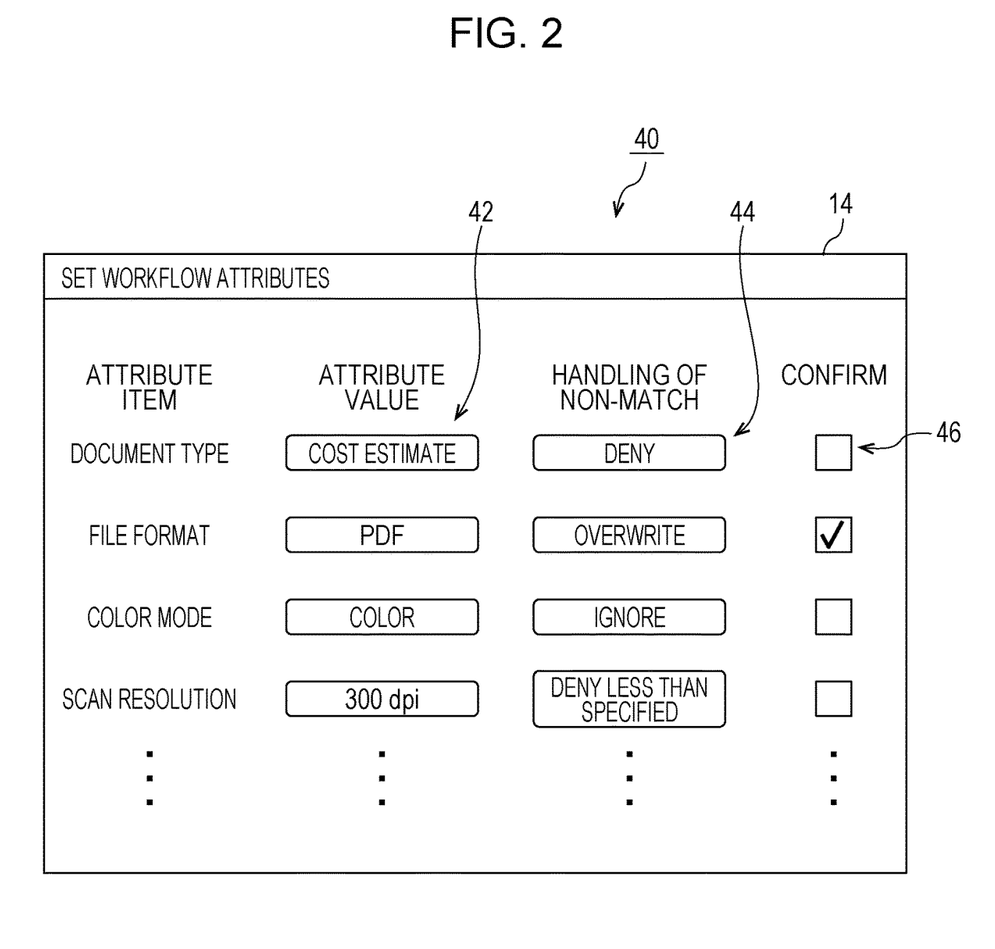
FIG. 2 is a diagram illustrating an example of a flow attribute setting screen.

Next, the user or administrator sets attributes (referred to as "flow attributes" in this specification) of the workflow to newly generate. FIG. 2 illustrates an example of a flow attribute setting screen 40 displayed on the display 14. When the user or administrator inputs an instruction to start setting the attributes of the workflow to newly generate into the input interface 18, the flow attribute setting screen 40 is displayed on the display 14.

Flow attributes refer to attributes of target data (in the exemplary embodiment, an electronic document) suited to the workflow. The flow attributes include one or multiple attribute items, an attribute value for each attribute item, and setting information (the details of which will be described later) for each attribute item. In the case where the attribute values of the attribute items in the flow attributes and the attribute values of the attribute items corresponding to an electronic document all match, the electronic document is inputtable into the workflow. Also, as described later, even in the case where the attribute values of the attribute items in the flow attributes and the attribute values of the attribute items corresponding to an electronic document do not, or in other words are different, it is still possible to input the electronic document into the workflow insofar as certain conditions are satisfied.

As illustrated in FIG. 2, the attribute items in the flow attributes include items such as a "document type" indicating the class of the content of the electronic document, a "file format" indicating the file format of the electronic document, a "color mode" illustrating the color mode of the electronic document, and a "scan resolution" indicating the resolution of the electronic document. Obviously, the attribute items in the flow attributes are not limited to the above, and may also include other attribute items such as the original orientation (which may have a value such as "left-facing") and the scan size (which may have a value such as "A4"), for example.

On the flow attribute setting screen 40, the user or administrator inputs the attribute value of each attribute item into a value input field 42. Alternatively, the user or administrator selects an attribute value from among multiple options prepared in advance. For example, in the example of FIG. 4, "cost estimate" is set as the attribute value for the "document type" attribute item, "PDF" is set as the attribute value for the "file format" attribute item, "color" is set as the attribute value for the "color mode" attribute item, and "300 dpi" is set as the attribute value for the "scan resolution" attribute item.

In the exemplary embodiment, the handling of a non-match may be set as setting information for each attribute item. The "handling of a non-match" indicates how to handle the case where the attribute value of an attribute item in the flow attributes does not match the attribute value of the attribute item corresponding to the electronic document to be input into the workflow. The handling of a non-match may be set for each attribute item. Also, in the exemplary embodiment, the handling that is selectable differs depending on the attribute item, but "deny", "deny less than specified", "ignore", and "overwrite" are selectable as ways to handle the case of a non-match.

In the case where "deny" is selected, if the attribute value of the attribute item in the flow attributes does not match the attribute value of the attribute item corresponding to the electronic document, the workflow does not accept the electronic document. For example, in the case where the handling of a non-match is "deny" for the "document type" attribute item having an attribute value of "cost estimate", an electronic document whose document type is "invoice" is not inputtable into the workflow.

In the case where "deny less than specified" is selected, if the attribute value of the attribute item corresponding to the electronic document is less than the attribute value of the attribute item in the flow attributes, the workflow does not accept the electronic document. For example, in the case where the handling of a non-match is "deny less than specified" for the "scan resolution" attribute item having an attribute value of "300 dpi", an electronic document whose scan resolution is less than 300 dpi (for example, 200 dpi) is not inputtable into the workflow. On the other hand, in the case where the handling of a non-match is "deny less than specified" for the "scan resolution" attribute item having an attribute value of "300 dpi", an electronic document whose scan resolution is 300 dpi or greater (for example, 400 dpi) is inputtable into the workflow. "Deny less than specified" is selectable for attribute items whose attribute value is expressed numerically.

In the case where "ignore" is selected, the workflow still accepts the electronic document even if the attribute value of the attribute item in the flow attributes does not match the attribute value of the attribute item corresponding to the electronic document. For example, in the case where the handling of a non-match is "ignore" for the "color mode" attribute item having an attribute value of "color", an electronic document whose color mode is "black and white" is inputtable into the workflow.

In the case where "overwrite" is selected, if the attribute value of the attribute item in the flow attributes does not match the attribute value of the attribute item corresponding to the electronic document, the workflow accepts the electronic document after first changing the attribute value of the attribute item corresponding to the electronic document to the attribute value of the attribute item in the flow attributes. For example, in the case where the handling of a non-match is "overwrite" for the "file format" attribute item having an attribute value of "PDF" in the flow attributes, an electronic document in the XDW file format is converted to the PDF file format and then input into the workflow.

Also, an indication of whether or not to seek confirmation from the user who selected the workflow may be set as another piece of setting information for each attribute item. Herein, "confirmation" means that in the case where the attribute value of an attribute item in the flow attributes does not match the attribute value of the attribute item corresponding to an electronic document, the user attempting to input the electronic document into the workflow is asked to confirm the input of the electronic document. Confirmation or non-confirmation may be set for each attribute item.

When the user or administrator inputs flow attributes on the flow attribute setting screen 40, the workflow generation unit 26 assigns identification information, namely a workflow ID, to the generated workflow, and causes the memory 20 to store the workflow ID, the name of the workflow, the types and order of processes to be executed in the workflow, and the flow attributes in association with each other as the workflow information 22. With this arrangement, the workflow becomes selectable by the information processing device 10.

Figure 3:
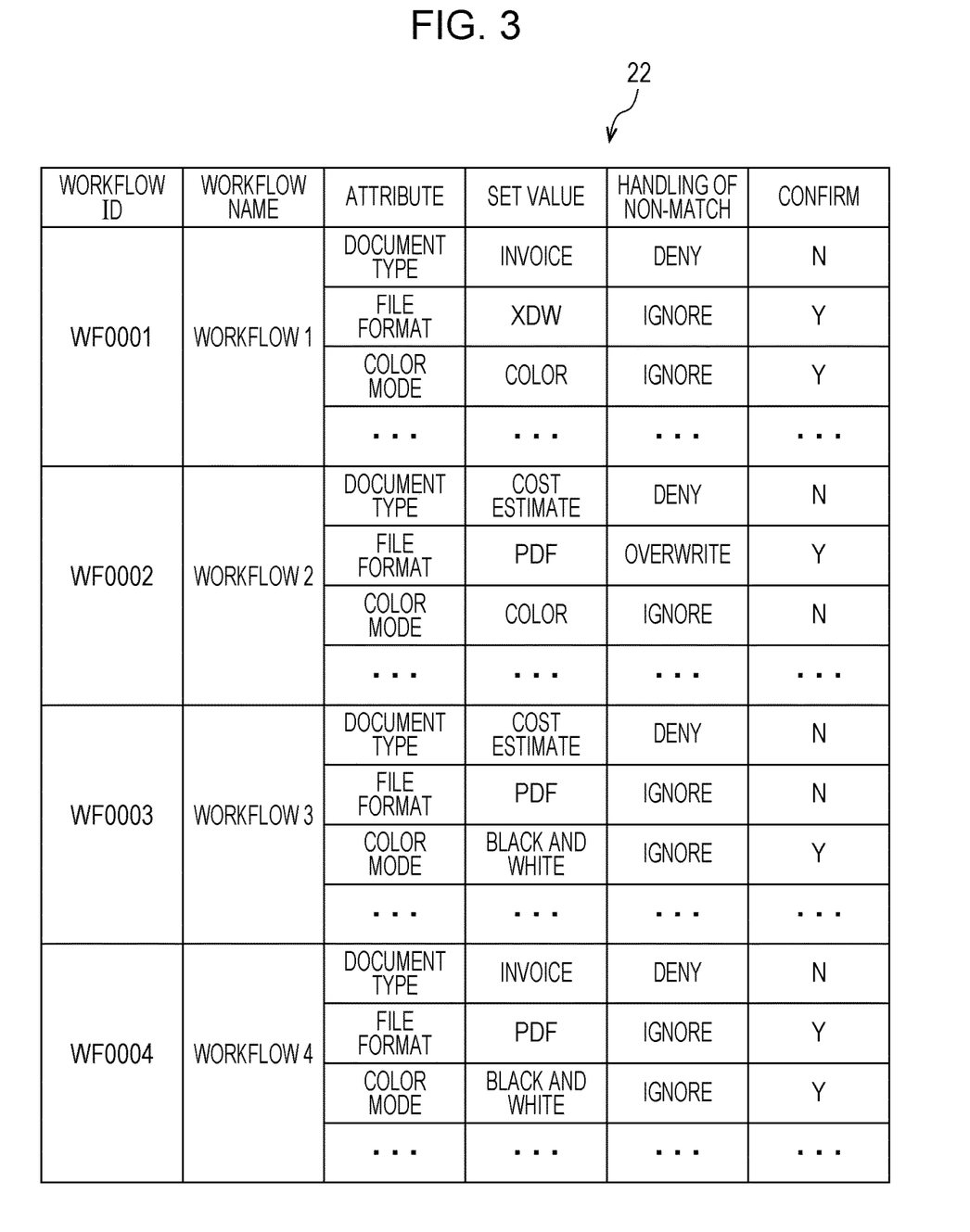
FIG. 3 is a diagram illustrating an example of the content of workflow information.

Multiple workflows may be generated by the workflow generation unit 26. If multiple workflows are generated, information related to the multiple workflows is stored as the workflow information 22. FIG. 3 illustrates an example of the content of the workflow information 22. As illustrated in FIG. 3, in the workflow information 22, for each workflow (for each workflow ID), the name of the workflow, an attribute value for each attribute item, the handling of a non-match, and the presence or absence of confirmation are stored in association with each other. Obviously, although not illustrated in FIG. 3, the types and order of processes to be executed in the workflow are also associated with each workflow ID in the workflow information 22.

Returning to FIG. 1, the display control unit 28 performs a process of causing the display 14 to display various screens. In particular, the display control unit 28 causes the display 14 to display a screen enabling the user to select a workflow into which to input an electronic document.

The workflow selection unit 30 follows a user instruction to perform a process of selecting the workflow to process an electronic document from among the multiple workflows generated by the workflow generation unit 26.

The process execution unit 32 executes a process on the electronic document designated by the user according to the workflow selected by the workflow selection unit 30.

Hereinafter, FIGS. 4 to 8 will be referenced to describe the details of the method of selecting a workflow to process an electronic document as well as the processing by the display control unit 28, the workflow selection unit 30, and the process execution unit 32.

Figure 4:
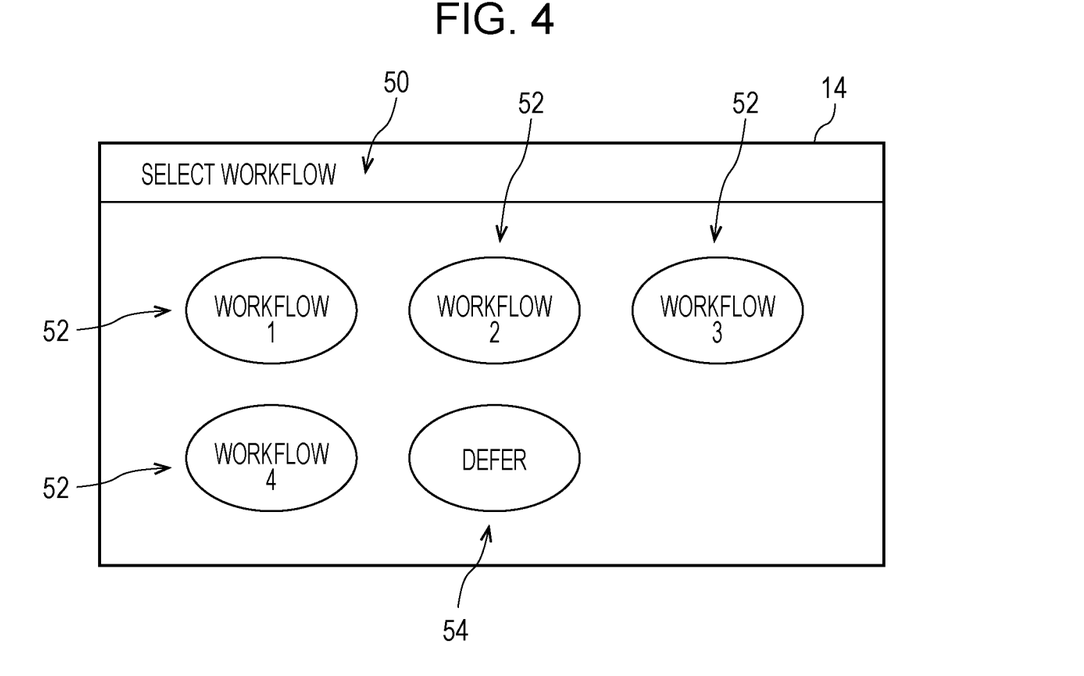
FIG. 4 is a diagram illustrating an example of a first workflow selection screen.

Before the user inputs target data, namely an electronic document, into the information processing device 10, if the user uses the input interface 18 to input into the information processing device 10 an instruction to execute the process of selecting a workflow to process the electronic document, the display control unit 28 causes the display 14 to display a first workflow selection screen 50 illustrated in FIG. 4. The first workflow selection screen 50 is generated by the workflow generation unit 26, and includes workflow buttons 52 corresponding to the workflows stored in the workflow information 22, or in other words, the workflows available to the user on the information processing device 10. Note that in this specification, a workflow button 52 corresponding to a workflow being displayed on the display 14 may be described as the workflow being displayed on the display 14 for the sake of convenience in some cases.

By selecting one of the workflow buttons 52, the user is able to select a workflow to process the electronic document before inputting the electronic document into the information processing device 10, or in other words, before the information processing device 10 receives the electronic document. When the user selects a workflow button 52 on the first workflow selection screen 50, the workflow selection unit 30 selects the workflow corresponding to the workflow button 52 selected by the user as the workflow to process the electronic document. After that, the user uses the scanner 16 to convert a paper document into an electronic document, and the process execution unit 32 executes a process according to the selected workflow on the electronic document.

The operating mode of the information processing device 10 in the case where a workflow button 52 has been selected on the first workflow selection screen 50, or in other words, the operating mode in which the information processing device 10 receives the selection of a workflow to process an electronic document before receiving the electronic document, is called a first mode.

Also, the first workflow selection screen 50 includes a defer button 54. In the case where the user selects the defer button 54, the user is able to select a workflow to process an electronic document after inputting the electronic document into the information processing device 10, or in other words, after the information processing device 10 receives the electronic document. If the user selects the defer button 54 on the first workflow selection screen 50, at this timing, the workflow selection unit 30 does not select a workflow to process the electronic document. After selecting the defer button 54, the user uses the scanner 16 to convert a paper document into an electronic document. In other words, the information processing device 10 receives an electronic document as the target data. In this case, the electronic document is stored in the memory 20 as a deferred document for which a workflow to process the electronic document is not selected. As described later, the workflow selection unit 30 selects the workflow to process the electronic document after the information processing device 10 receives the electronic document.

The operating mode of the information processing device 10 in the case where the defer button 54 has been selected on the first workflow selection screen 50, or in other words, the operating mode in which the information processing device 10 receives the selection of a workflow to process an electronic document after receiving the electronic document, is called a second mode.

As described above, according to the information processing device 10 according to the exemplary embodiment, because it is possible to select between the first mode in which the information processing device 10 receives the selection of the workflow to process the electronic document before receiving the electronic document and the second mode in which the information processing device 10 receives the selection of the workflow to process the electronic document after receiving the electronic document, the user is able to appropriately select the timing at which to select the workflow to process the electronic document.

Figure 5:
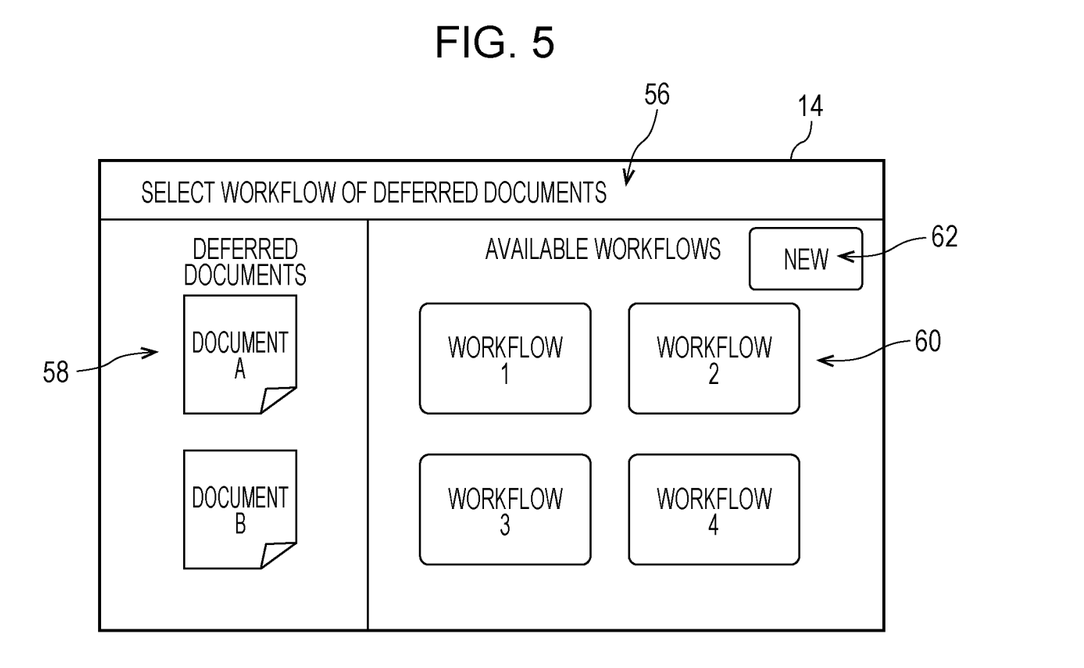
FIG. 5 is a diagram illustrating a first example of a second workflow selection screen.

After a deferred document is stored in the memory 20, if the user uses the input interface 18 to input into the information processing device 10 an instruction to execute the process of selecting a workflow to process the deferred document, the display control unit 28 causes the display 14 to display a second workflow selection screen 56 illustrated in FIG. 5.

The second workflow selection screen 56 includes deferred document icons 58 corresponding to deferred documents, that is, electronic documents before a workflow is selected, and workflow icons 60 corresponding to workflows available to the user in the information processing device 10. Note that in this specification, a deferred document icon 58 corresponding to a deferred document being displayed on the display 14 may be described as the deferred document being displayed on the display 14 for the sake of convenience, and a workflow icon 60 corresponding to a workflow being displayed on the display 14 may be described as the workflow being displayed on the display 14 for the sake of convenience in some cases.

In the case where multiple deferred documents are stored in the memory 20, multiple deferred documents may be displayed on the second workflow selection screen 56, as illustrated in FIG. 5. Also, in the case where the user becomes able to operate the information processing device 10 after the information processing device 10 authenticates the user (for example, in the case where the user logs in to the information processing device 10 before operating the information processing device 10), a user identification that identifies the user, namely a user ID, and each deferred document input by the user may be stored in association with each other in the memory 20, and only the deferred document(s) input into the information processing device 10 by the user may be displayed on the second workflow selection screen 56.

On the second workflow selection screen 56, if the user selects a deferred document icon 58 and then selects a workflow icon 60, the workflow selection unit 30 selects the workflow corresponding to the selected workflow icon 60 as the workflow to process the deferred document corresponding to the selected deferred document icon 58. For example, by dragging one of the deferred document icons 58 onto one of the workflow icons 60 on the second workflow selection screen 56, the user is able to select a deferred document icon 58 and also select a workflow icon 60. After the workflow to process the deferred document is selected, the process execution unit 32 executes a process according to the selected workflow on the deferred document.

In addition, the display control unit 28 may also cause a generate workflow button 62 for inputting an instruction to create a new workflow to be displayed on the second workflow selection screen 56. With this configuration, the user is able to create a new workflow suited to the deferred document in cases such as where a workflow suited to the deferred document does not exist. By causing the generate workflow button 62 to be displayed on the second workflow selection screen 56, it can be said that the information processing device 10 is capable of newly creating a workflow for processing target data, that is, an electronic document, after the electronic document is received.

In the second mode, it is desirable for attributes of a deferred document (referred to as "data attributes" in this specification) to be stored in association with the deferred document in the memory 20. The data attributes include the same attribute items as the attribute items of the flow attributes, and attribute values for the attribute items. The data attributes are acquired by the processor 24 by analyzing the deferred document or on the basis of information such as scan settings when the scanner 16 generates the deferred document. For example, the attribute value for the "document type" attribute item may be acquired by analyzing a character string included in a specific area of the deferred document, by analyzing the format of the deferred document, or the like. Also, when the scanner 16 generates the deferred document, the document type of the deferred document may be input by the user. Also, the attribute value for an attribute item such as "file format", "color mode", "scan resolution", "original orientation", or "scan size" is acquired on the basis of the scan settings when the scanner 16 generates the deferred document.

The display control unit 28 may also cause only the workflows capable of processing the deferred document to be displayed on the second workflow selection screen 56, on the basis of the data attributes of the deferred document and the flow attributes of the workflows available to the user on the information processing device 10. In the case where multiple deferred documents are stored in the memory 20 and multiple deferred documents are displayed on the second workflow selection screen 56, if one of the deferred documents is selected by the user, the display control unit 28 displays only the workflows capable of processing the selected deferred document.

First of all, the workflows capable of processing the deferred document include the workflow having flow attributes matching the data attributes of the deferred document. The "flow attributes matching the data attributes of the deferred document" means that the attribute values for the multiple attribute items included in the flow attributes are all the same as the attribute values for the corresponding attribute items of the data attributes. For example, in the case where the content of the workflow information 22 is the content illustrated in FIG. 3, and in the data attributes of the deferred document, the "document type" attribute item has an attribute value of "invoice", the "file format" attribute item has an attribute value of "XDW", and the "color mode" attribute item has an attribute value of "color", the workflows capable of processing the deferred document include "workflow 1" with matching flow attributes.

Also, even if the attribute value of an attribute item in the flow attributes is different from the attribute value of the corresponding attribute item in the data attributes of the deferred document, in the case where the handling of a non-match is "ignore" or "overwrite" for the attribute item, the workflow is capable of processing the deferred document. For example, in the case where the content of the workflow information 22 is the content illustrated in FIG. 3, and in the data attributes of the deferred document, the "document type" attribute item has an attribute value of "invoice", the "file format" attribute item has an attribute value of "XDW", and the "color mode" attribute item has an attribute value of "color", a comparison between the data attributes of the deferred document and the flow attributes of "workflow 4" demonstrates that, although the attribute values of the "file format" and "color mode" attribute items are both different, in the workflow information 22, the handling of a non-match is "ignore" for both the "file format" and "color mode" attribute items of "workflow 4", and therefore "workflow 4" is included among the workflows capable of processing the deferred document.

Also, even if there is an attribute item with different attribute values between the flow attributes and the data attributes of the deferred document, in the case where the handling of a non-match is set to "deny less than specified" for the attribute item in the flow attributes, the workflow may be capable of processing the deferred document, depending on the attribute value of the attribute item in the data attributes. For example, in the case where, for certain data attributes and certain flow attributes, the only attribute item with different attribute values is "scan resolution", the attribute value of the "scan resolution" attribute item in the flow attributes is "300 dpi", and the handling of a non-match is "deny less than specified", if the attribute value of the "scan resolution" data attribute in the data attributes is "300 dpi" or greater, the workflow is capable of processing the deferred document. On the other hand, if the attribute value of the "scan resolution" attribute item in the data attributes is less than "300 dpi", the workflow is incapable of processing the deferred document.

Figure 6:
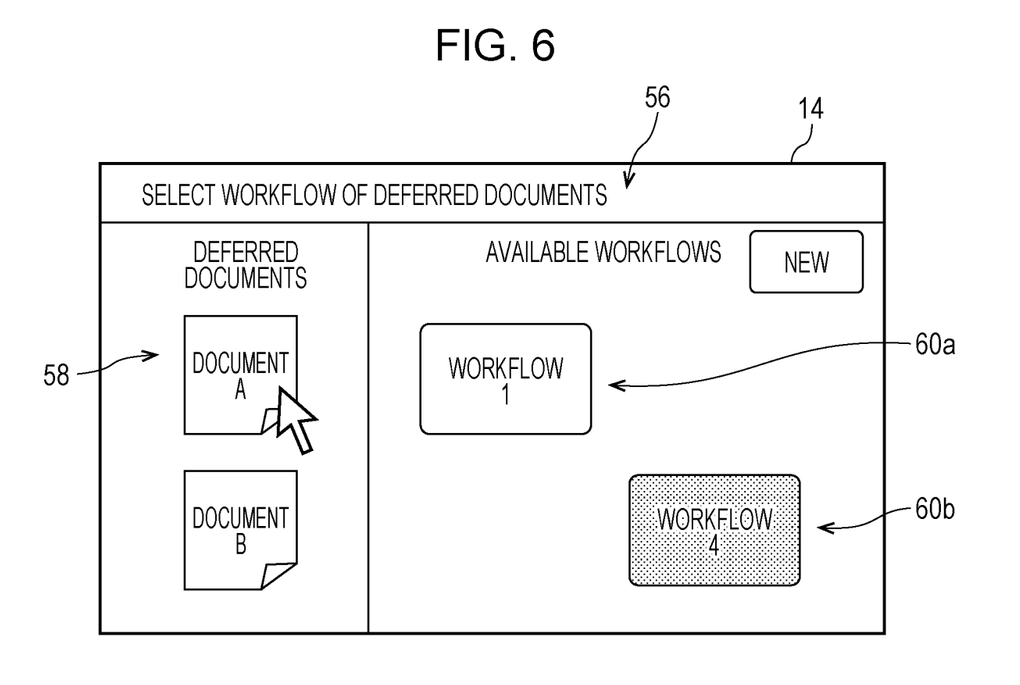
FIG. 6 is a diagram illustrating a second example of a second workflow selection screen.

In the case where the content of the workflow information 22 is the content illustrated in FIG. 3, and the user selects a deferred document A in which the "document type" attribute item has an attribute value of "invoice", the "file format" attribute item has an attribute value of "XDW", and the "color mode" attribute item has an attribute value of "color", the workflows capable of processing the deferred document are "workflow 1" and "workflow 4". Therefore, as illustrated in FIG. 6, the display control unit 28 causes "workflow 1" and "workflow 4" to be displayed on the second workflow selection screen 56.

With this arrangement, the user is able to grasp which workflows are capable of processing the selected deferred document, while in addition, the selection of a workflow incapable of processing the selected deferred document is avoided.

It is desirable for the display control unit 28 to display the workflows such that a workflow whose flow attributes matches the data attributes of the deferred document and a workflow whose flow attributes do not match the data attributes of the deferred document, but is still capable of processing the deferred document, are distinguished from each other.

In the example described above, the flow attributes of "workflow 1" match the data attributes of the deferred document A, and "workflow 4" has flow attributes that are different from the data attributes of the deferred document A, but "workflow 4" is capable of processing the deferred document A. Consequently, as illustrated in FIG. 6, the display control unit 28 causes a workflow icon 60a corresponding to "workflow 1" and a workflow icon 60b corresponding to "workflow 4" to be displayed in different ways. In the example of FIG. 6, the workflow icon 60a corresponding to "workflow 1" is displayed without shading while the workflow icon 60b corresponding to "workflow 4" is displayed with shading. However, insofar as the display method is different between the two, the workflow icon 60a and the workflow icon 60b may also be displayed according to other display methods.

With this arrangement, the user is able to distinguish whether a workflow displayed on the second workflow selection screen 56 is a workflow whose flow attributes match the data attributes of the selected deferred document, or a workflow whose flow attributes do not match the data attributes of the deferred document, but is still capable of processing the deferred document.

Figure 7:
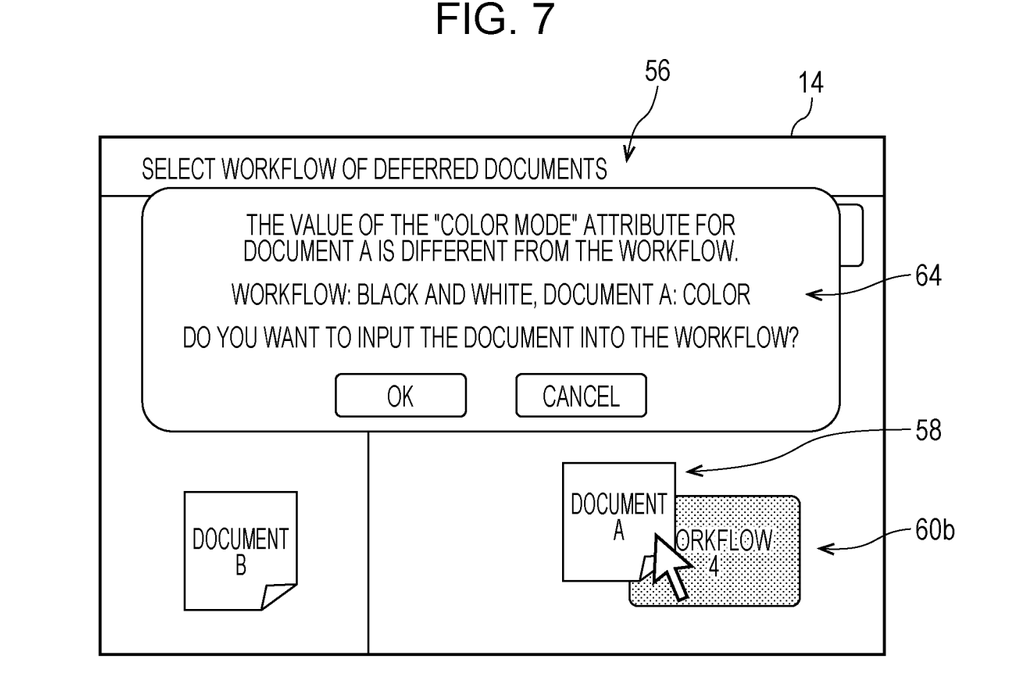
FIG. 7 is a diagram illustrating a first example of a screen displaying a message to a user.

On the second workflow selection screen 56, in the case where the user selects a workflow whose flow attributes do not match the data attributes of the deferred document (for example, "workflow 4" in FIG. 6), before the workflow selection unit 30 selects the workflow as the workflow to process the deferred document, as illustrated in FIG. 7, the display control unit 28 may cause the display 14 to display a message 64 asking the user to confirm whether or not to process the deferred document with the workflow.

It is desirable for the message 64 to not only indicate that the data attributes of the selected deferred document and the flow attributes of the selected workflow are different, but also indicate which attribute item or items have different attribute values and display the attribute value of the attribute item in the data attributes and the attribute value of the attribute item in the flow attributes.

If the user selects an OK button included in the message 64, the workflow selection unit 30 selects the workflow selected by the user as the workflow to process the deferred document, and the process execution unit 32 executes a process according to the selected workflow on the deferred document. On the other hand, if the user selects a CANCEL button included in the message 64, the workflow selection unit 30 does not select a workflow to process the deferred document, and the display control unit 28 causes the display 14 to display the second workflow selection screen 56 as illustrated in FIG. 5 or 6 again.

Note that in the exemplary embodiment, the display control unit 28 asks the user to confirm whether or not to process the deferred document with the selected workflow by causing the display 14 to display the message 64. However, the information processing device 10 may also be provided with a speaker and a microphone, and by having the processor 24 output sound from the speaker, the user may be queried about whether or not to process the deferred document with the selected workflow, and the user may speak into the microphone to input a response (affirmative or negative) to the query.

Also, on the second workflow selection screen 56, in the case where the user selects a workflow whose flow attributes do not match the data attributes of the deferred document, or in other words, in the case where an attribute item with non-matching attribute values exists in the flow attributes and the data attributes, and user confirmation (that is, confirmation "Y") is set for the attribute item in the workflow information 22, the display control unit 28 may cause the display 14 to display the message 64 asking the user to confirm whether or not to process the deferred document with the workflow. In other words, in the case where the flow attributes and the data attributes contain different attribute values of an attribute item for which user non-confirmation (that is, confirmation "N") is set in the workflow information 22, the display control unit 28 may not cause the display 14 to display the message 64.

Figure 8:
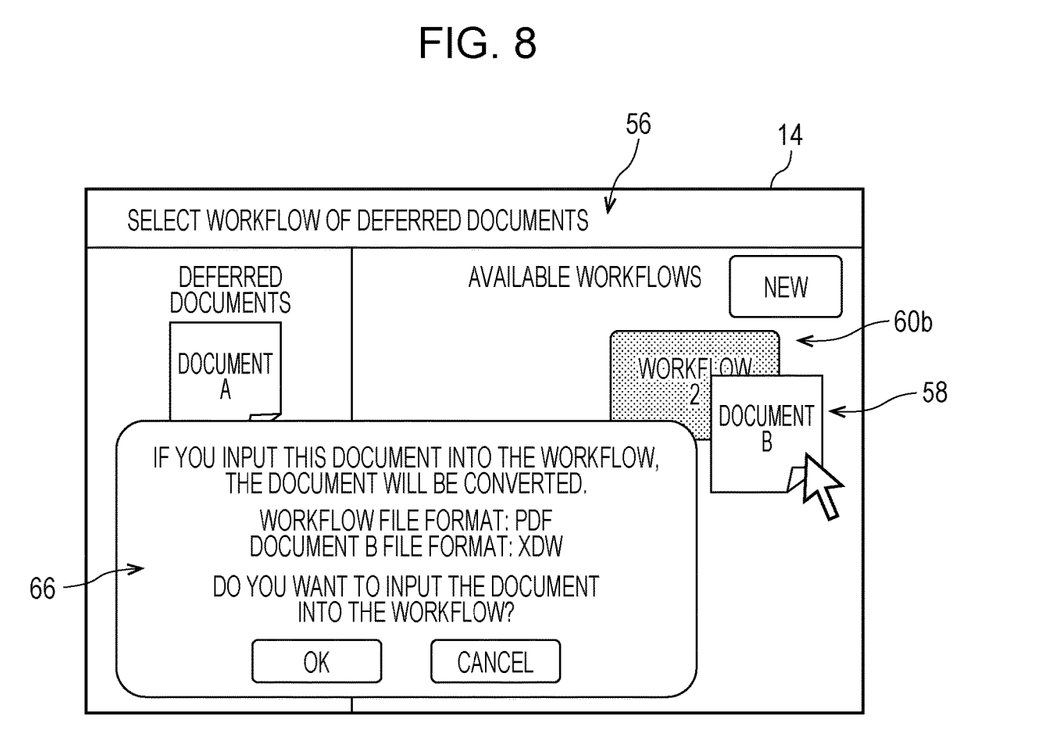
FIG. 8 is a diagram illustrating a second example of a screen displaying a message to a user.

Furthermore, on the second workflow selection screen 56, in the case where the user selects a workflow whose flow attributes do not match the data attributes of the deferred document, or in other words, in the case where an attribute item with non-matching attribute values exists in the flow attributes and the data attributes, and the handling of a non-match is set to "overwrite" for the attribute item in the workflow information 22, before the workflow selection unit 30 selects the workflow as the workflow to process the deferred document, as illustrated in FIG. 8, the display control unit 28 may cause the display 14 to display a message 66 asking the user to confirm whether or not to process the deferred document with the workflow.

If the user selects an OK button included in the message 66, the workflow selection unit 30 selects the workflow selected by the user as the workflow to process the deferred document, and the process execution unit 32 overwrites (that is, converts) the deferred document in accordance with the workflow information 22 and then executes a process according to the selected workflow on the converted deferred document. On the other hand, if the user selects a CANCEL button included in the message 66, the workflow selection unit 30 does not select a workflow to process the deferred document, the process execution unit 32 does not execute the overwriting process, and the display control unit 28 causes the display 14 to display the second workflow selection screen 56 as illustrated in FIG. 5 or 6 again.

Note that, on the second workflow selection screen 56, in the case where the user selects a workflow whose flow attributes do not match the data attributes of the deferred document, or in other words, in the case where an attribute item with non-matching attribute values exists in the flow attributes and the data attributes, the handling of a non-match is set to "overwrite" for the attribute item in the workflow information 22, and user confirmation (that is, confirmation "Y") is set for the attribute item in the workflow information 22, the display control unit 28 may also display the message 66.

Figure 9:
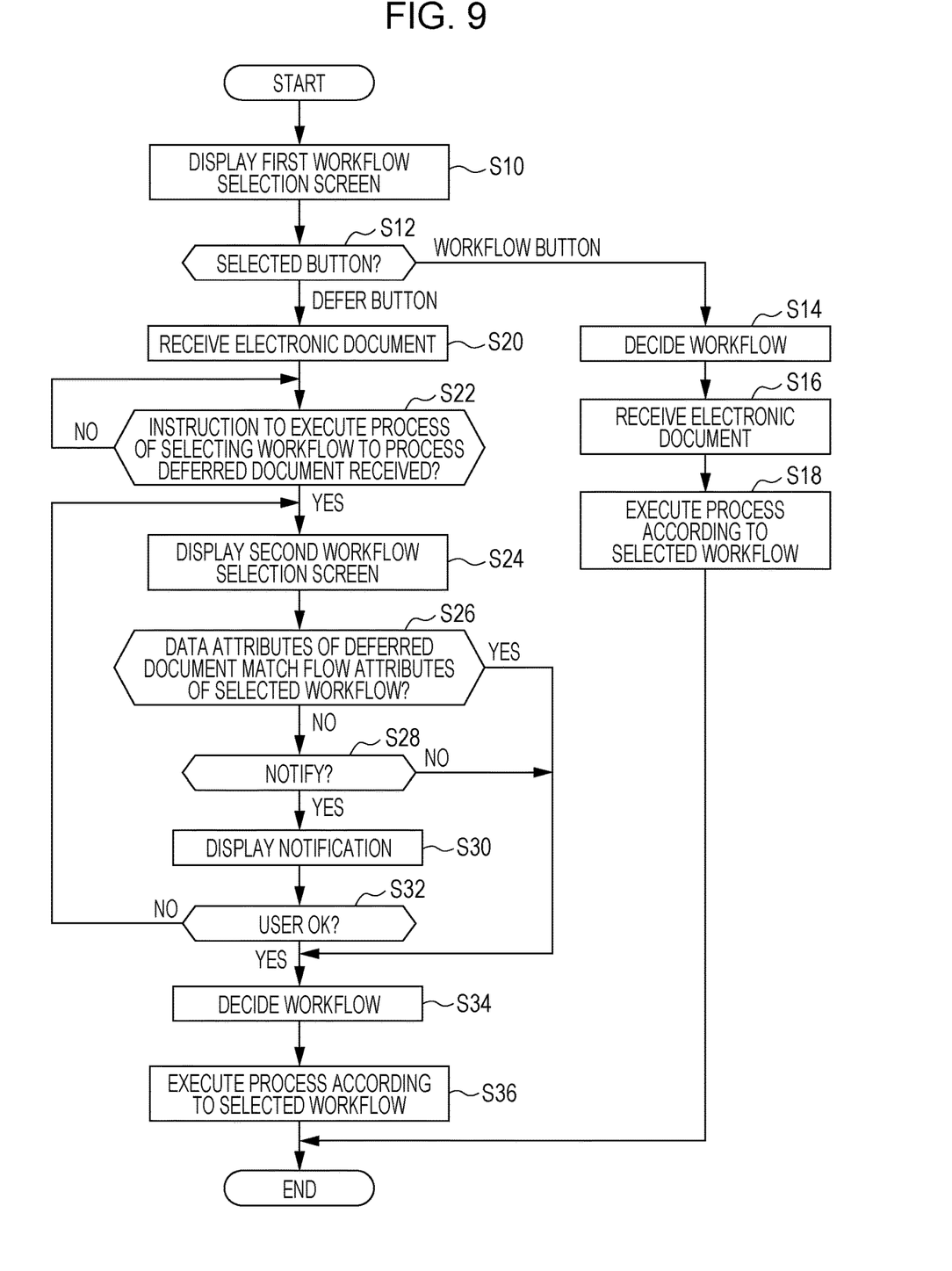
FIG. 9 is a flowchart illustrating a flow by the information processing device according to the exemplary embodiment.

Hereinafter, a flow of the process by the information processing device 10 will be described according to the flowchart illustrated in FIG. 9. It is assumed that at the time when the flowchart in FIG. 9 is started, multiple workflows have been generated by the workflow generation unit 26, or in other words, multiple workflows are available on the information processing device 10.

In step S10, if the user uses the input interface 18 to input into the information processing device 10 an instruction to execute the process of selecting a workflow, the display control unit 28 causes the display 14 to display the first workflow selection screen 50 (see FIG. 4).

In step S12, the processor 24 determines which button is selected by the user on the first workflow selection screen 50.

In the case where a workflow button 52 is selected, the operating mode of the information processing device 10 switches to the first mode, and the flow proceeds to step S14.

In step S14, the workflow selection unit 30 selects the workflow corresponding to the workflow button 52 selected by the user in step S12.

In step S16, the user uses the scanner 16 to convert a paper document into an electronic document. In other words, the information processing device 10 receives the electronic document as the target data.

In step S18, the process execution unit 32 executes a process according to the workflow selected in step S14 on the electronic document received in step S16.

In this way, in the first mode, the workflow to process an electronic document is selected before the information processing device 10 receives the electronic document.

In the case where the defer button 54 is selected in step S12, the operating mode of the information processing device 10 switches to the second mode, and the flow proceeds to step S20.

In step S20, the user uses the scanner 16 to convert a paper document into an electronic document. In other words, the information processing device 10 receives the electronic document as the target data. At this time, the processor 24 acquires the data attributes of the electronic document. Because a workflow for the electronic document has not been selected yet, the electronic document is stored in association with the data attributes in the memory 20 as a deferred document.

In step S22, the processor 24 stands by to receive an instruction to execute the process of selecting the workflow to process the deferred document from the user, and in the case where the processor 24 receives the instruction to execute the process of selecting the workflow to process the deferred document, the flow proceeds to step S24.

In step S24, the display control unit 28 causes the display 14 to display the second workflow selection screen 56. At this point, in the case where a deferred document is selected on the second workflow selection screen 56, as illustrated in FIG. 6, it is assumed that the display control unit 28 only displays workflows capable of processing the selected deferred document.

In step S26, the display control unit 28 determines whether or not the data attributes of the deferred document selected on the second workflow selection screen 56 match the flow attributes of the selected workflow. In the case of matching attributes, the process from step S28 to step S32 is bypassed, and the flow proceeds to step S34. In the case of non-matching attributes, or in other words, in the case where any attribute item has different attribute values between the data attributes and the flow attributes, the flow proceeds to step S28.

In step S28, the display control unit 28 determines whether or not to seek user confirmation, on the basis of the workflow information 22. Specifically, it is determined whether or not confirmation "Y" is associated in the workflow information 22 with each attribute item determined to have different attribute values between the data attributes and the flow attributes in step S26. In the case where confirmation "Y" is associated with any attribute item determined to have different attribute values between the data attributes and the flow attributes, it is determined that user confirmation is sought, and the flow proceeds to step S30, whereas in the case where confirmation "N" is associated with all of the attribute item(s) determined to have different attribute values between the data attributes and the flow attributes, it is determined that user confirmation is not sought, the processes in steps S30 and S32 are bypassed, and the flow proceeds to step S34.

In step S30, the display control unit 28 displays the message 64 (see FIG. 7) on the display 14.

In step S32, the workflow selection unit 30 determines whether or not the user has input an OK instruction with respect to the message 64. Specifically, in the case where the OK button included in the message 64 is operated by the user, it is determined that the user has input the OK instruction, and the flow proceeds to step S34. In the case where the CANCEL button included in the message 64 is operated by the user, it is determined that the user has not input the OK instruction, the flow returns to step S24, and the display control unit 28 displays the second workflow selection screen 56 again on the display 14.

In step S34, the workflow selection unit 30 selects the workflow selected in step S26 as the workflow to process the electronic document received in step S20.

In step S36, the process execution unit 32 executes a process according to the workflow selected in step S34 on the electronic document received in step S20.

In this way, in the second mode, the workflow to process an electronic document is selected after the information processing device 10 receives the electronic document.

The foregoing describes an exemplary embodiment according to the present disclosure, but the present disclosure is not limited to the above exemplary embodiment, and various modifications are possible within a scope that does not depart from the gist of the present disclosure.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
a processor programmed to:
receive an instruction from a user, the instruction being a selection from options of choosing a specific workflow and deferring choosing the specific workflow;
operate in a first mode that receives the choice of the specific workflow as a workflow to process target data before the target data is received when the instruction is the choosing the specific workflow; and
operate in a second mode that receives the selection of a workflow to process target data after the target data is received when the instruction is the deferring choosing the specific workflow, wherein when the instruction is the deferring choosing the specific workflow, the target data is stored as a deferred target data with other deferred target data upon receipt, and the second mode includes displaying a list of all of the deferred target data alongside a list of available workflows.

2. The information processing device according to claim 1, wherein the processor is programmed to cause, in the second mode, a display to display:
the target data before a workflow is selected; and
a workflow available to the user for selection.

3. The information processing device according to claim 2, wherein the processor is programmed to cause the display to display the workflow by displaying a workflow capable of processing the target data on a basis of data attributes and flow attributes, the data attributes being attributes of the target data, the flow attributes being attributes of the workflow.

4. The information processing device according to claim 3, wherein:
the displayed workflow is a first workflow; and
the processor is programmed to:
cause the display to display the first workflow by causing the display to display a workflow having flow attributes that match the data attributes; and
cause the display to display a second workflow distinguishably from the first workflow, the second workflow having flow attributes different from the data attributes but still capable of processing the target data.

5. The information processing device according to claim 3, wherein:
each of the data attributes and the flow attributes includes a plurality of attribute items;
an attribute item of the flow attributes has a setting that indicates whether the workflow is capable of processing the target data even though an attribute value of the attribute item of the data attributes of the target data is different from an attribute value of a corresponding attribute item of the flow attributes of the workflow; and
the processor is programmed to:
cause, based on an indication by the attribute item that the workflow is capable of processing the target data even though the attribute value of the attribute item of the data attributes of the target data and the attribute value of the corresponding attribute item of the flow attributes of the workflow, the display to display the workflow as a workflow capable of processing the target data.

6. The information processing device according to claim 4, wherein:
each of the data attributes and the flow attributes includes a plurality of attribute items;
an attribute item of the flow attributes has a setting that indicates whether the workflow is capable of processing the target data even though an attribute value of the attribute item of the data attributes of the target data is different from an attribute value of a corresponding attribute item of the flow attributes of the workflow; and
the processor is programmed to:
cause, based on an indication by the attribute item that the workflow is capable of processing the target data even though the attribute value of the attribute item of the data attributes of the target data and the attribute value of the corresponding attribute item of the flow attributes of the workflow, the display to display the workflow as a workflow capable of processing the target data.

7. The information processing device according to claim 3, wherein the processor is programmed to:
request, in the second mode, in a case where a workflow to process the target data is selected and the data attributes are different from the flow attributes of the selected workflow, user confirmation about whether to process the target data with the selected workflow.

8. The information processing device according to claim 7, wherein
each of the data attributes and the flow attributes includes a plurality of attribute items;
an attribute item of the flow attributes has a setting that indicates whether to seek user confirmation to allow the selected workflow to process the target data in a case where an attribute value of the attribute item of the data attributes of the target data is different from an attribute value of a corresponding attribute item of the flow attributes of the selected workflow; and
the processor is programmed to request user input, in a case where an attribute value of an attribute item of the flow attributes set such that user confirmation is sought is different from an attribute value of a corresponding attribute item of the data attributes, indicating whether to process the target data with the selected workflow.

9. A non-transitory computer-readable medium storing a program causing a computer to execute a process for processing information, the process comprising:
receiving an instruction from a user, the instruction being a selection from options of choosing a specific workflow and deferring choosing the specific workflow;
operate in a first mode that receives the choice of the specific workflow as a workflow to process target data before the target data is received when the instruction is the choosing the specific workflow; and
operate in a second mode that receives a selection of the workflow to process target data after the target data is received when the instruction is the deferring choosing the specific workflow, wherein when the instruction is the deferring choosing the specific workflow, the target data is stored as a deferred target data with other deferred target data upon receipt, and the second mode includes displaying a list of all of the deferred target data alongside a list of available workflows.

10. An information processing device comprising:
receiving means for receiving an instruction from a user, the instruction being a selection from options of choosing a specific workflow and deferring choosing the specific workflow;
operating means for operating in a first mode that receives of the choice of the specific workflow as a workflow to process target data before the target data is received when the instruction is the choosing the specific workflow; and
operating means for operating in a second mode that receives a selection of the workflow to process target data after the target data is received when the instruction is deferring the choosing the specific workflow, wherein when the instruction is the deferring choosing the specific workflow, the target data is stored as a deferred target data with other deferred target data upon receipt, and the second mode includes displaying a list of all of the deferred target data alongside a list of available workflows.

11. The information processing device according to claim 1, wherein a button for the choosing the specific workflow and a button for the deferring choosing the specific workflow are displayed in a same display area.

* * * * *